(12) United States Patent
Eden

(10) Patent No.: US 12,044,289 B2
(45) Date of Patent: Jul. 23, 2024

(54) BREAKAWAY CHAIN

(71) Applicant: Keith C. Eden, Rockford, IL (US)

(72) Inventor: Keith C. Eden, Rockford, IL (US)

(73) Assignee: Fasteners for Retail, Inc., Twinsburg, OH (US)

( * ) Notice: Subject to any disclaimer, the term of this patent is extended or adjusted under 35 U.S.C. 154(b) by 234 days.

(21) Appl. No.: 17/675,943

(22) Filed: Feb. 18, 2022

(65) Prior Publication Data

US 2023/0265909 A1 Aug. 24, 2023

(51) Int. Cl.
*F16G 13/14* (2006.01)
*E01F 13/04* (2006.01)

(52) U.S. Cl.
CPC .............. *F16G 13/14* (2013.01); *E01F 13/04* (2013.01)

(58) Field of Classification Search
CPC .......... F16G 13/14; F16G 15/04; E01F 13/04; E01F 13/028; Y10T 24/3902; Y10T 24/3904
USPC ....................................... 59/84, 90
See application file for complete search history.

(56) References Cited

U.S. PATENT DOCUMENTS

| | | | | |
|---|---|---|---|---|
| 612,138 A * | 10/1898 | Reeve | ...................... | F16G 15/04 292/264 |
| 1,031,401 A * | 7/1912 | Tirrill | ...................... | A44C 5/185 63/3 |
| 1,157,917 A * | 10/1915 | Allen | ...................... | A44C 5/185 24/698.2 |
| 3,027,615 A * | 4/1962 | Forney | ...................... | F16G 15/04 24/116 R |
| 4,860,532 A * | 8/1989 | Milz | ...................... | B21L 99/00 59/30 |
| 6,364,381 B1 * | 4/2002 | Schmidt | ................ | E01F 13/028 292/264 |
| 6,606,764 B2 * | 8/2003 | Taubner, III | ........... | A44C 5/209 24/115 F |
| 6,701,583 B1 * | 3/2004 | McCullough | ............ | A44C 5/20 63/3.2 |
| 8,602,468 B2 * | 12/2013 | Kutsen | ..................... | B66C 1/125 294/82.17 |
| 9,079,463 B2 * | 7/2015 | Walenta | ................... | F16G 15/04 |
| 9,670,987 B1 * | 6/2017 | Stolz | ........................ | F16G 15/12 |

* cited by examiner

*Primary Examiner* — Robert Sandy
*Assistant Examiner* — Louis A Mercado
(74) *Attorney, Agent, or Firm* — Reinhart Boerner Van Deuren P.C.

(57) ABSTRACT

A breakaway chain having a breakaway connector and first and second chain portions is provided. The breakaway connector includes a first opening is defined between a first wall portion and a second wall portion spaced away from the first wall portion. A first flexible gripping member extends from the first wall portion towards the second wall portion. A second opening is defined between a third wall portion and a fourth wall portion spaced away from the third wall portion. A second flexible gripping member extends from the third wall portion towards the fourth wall portion. The first chain portion has a first chain link. The first chain link inserts into the first opening and engages the first flexible gripping member. The second chain portion has a second chain link. The second chain link inserts into the first opening and engages the second flexible gripping member.

23 Claims, 8 Drawing Sheets

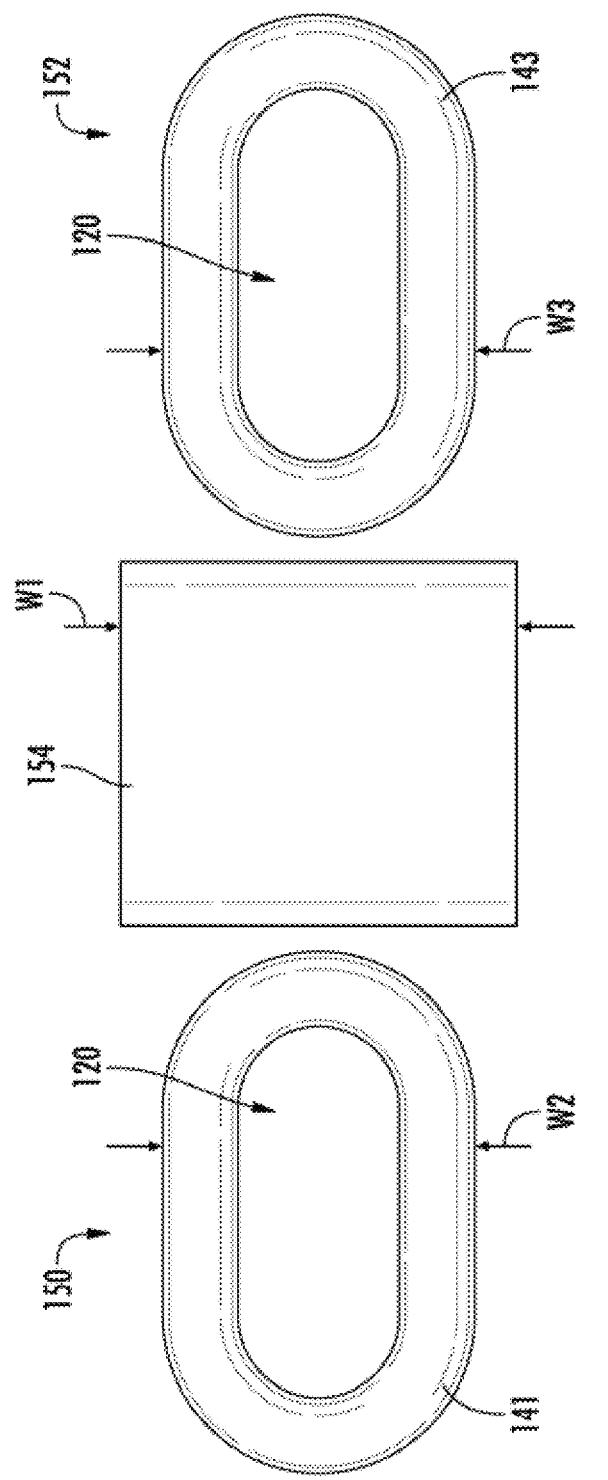

BREAKAWAY CHAIN

FIELD OF THE INVENTION

This invention generally relates to a barrier for blocking a walkway in a retail environment.

BACKGROUND OF THE INVENTION

Preventing patrons in a retail environment from accessing or walking through particular portions of the retail environment is common. For example, doors can be locked, cones can be positioned in front of the off-limit locations, signs can be located next to the area.

Retail environments often have multiple checkout lines that have walkways therebetween. At times, not all checkout lines are in service. To avoid theft, checkout lines that are not in service typically have a blocking member such as a chain that extends across the walkway and that prevents patrons from passing through the walkway.

Typically, the chain can be disconnected from one end or the other such that a person may pass through the walkway if necessary, such as if they are a store worker or in the event of an emergency.

Unfortunately, in an emergency, there may not be time to unhook the chain from the structure to which it is attached. As such, it is desirous to provide a blocking member that need not be unhooked from the support structure but that allows a person to still pass through the walkway or blocking member if necessary. It is also desirous to have a blocking member that can be reused used if a person passes through the blocking member without disconnecting it from the support structure.

Examples of the present disclosure provide improvements over the current state of the art.

BRIEF SUMMARY OF THE INVENTION

A new and improve blocking member is provided.

In an example of a blocking member, a breakaway chain having a breakaway connector and first and second chain portions is provided. The breakaway connector includes a first opening and a second opening. The first opening is defined between a first wall portion and a second wall portion spaced away from the first wall portion. A first flexible gripping member extends from the first wall portion towards the second wall portion. The second opening is defined between a third wall portion and a fourth wall portion spaced away from the third wall portion. A second flexible gripping member extends from the third wall portion towards the fourth wall portion. The first chain portion has a first chain link. The first chain link inserts into the first opening and engages the first flexible gripping member. The second chain portion has a second chain link. The second chain link inserts into the first opening and engages the second flexible gripping member.

In one example, the engagement between the first chain link and the breakaway connector is not greater than 5 lbs. such that the application of a force greater than 5 lbs. will cause the first chain link to be removed from the breakaway connector.

In one example, the first flexible gripping member is one of a plurality of first flexible gripping members. Each first gripping member of the plurality of first gripping members extends from the first wall portion towards the second wall portion.

In one example, the first chain link is inserted into the first opening through a first mouth of the first opening. The second chain link is inserted into the second opening through a second mouth of the second opening. The first and second mouths face away from one another.

In one example, a portion of the first chain link extends out of the first opening in a first direction. A portion of the second chain link extends out of the second opening in a second direction opposite the first direction. This can occur when the first and second chain links are fully inserted into the corresponding first and second opening.

In one example, the plurality of first flexible gripping members are axially spaced apart in a direction extending towards the second opening. The plurality of second flexible gripping members are axially spaced apart in a direction extending towards the first opening.

In one example, if either the first or second chain links is removed from the breakaway connector, the first or second chain link removed from the breakaway connector can be reinstalled into the corresponding first or second opening by axially sliding the first or second chain link into the opening and without latching the first or second opening to the breakaway connector.

For instance, no portion of the first or second chain link or the breakaway connector need be manually manipulated by the user to allow for insertion of the first or second chain link into the breakaway connector.

In one example, if either the first or second chain links is removed from the breakaway connector, when the first or second chain link is reinserted into the breakaway connector, the gripping force between the first or second chain link and the breakaway connector is at least 90% of the gripping force prior to the first or second chain link being removed from the breakaway connector. As such, the breakaway connector may be reused.

In one example, the first flexible gripping member extends away from the first wall portion at an angle and away from a mouth of the first opening towards the second opening. The second flexible gripping member extends away from the first wall portion at an angle and way from a mouth of the second opening towards the first opening.

In one example, insertion of the first chain link into the first opening bends the first flexible gripping member towards the second opening and towards the first wall portion. Insertion of the second chain link into the second opening bends the second flexible gripping member towards the first opening and towards the third wall portion.

In one example, insertion of the first chain link into the first opening resiliently bends the first flexible gripping member towards the second opening and towards the first wall portion such that if the first chain link is removed from the first opening, the first flexible gripping member resiliently bends back towards the second wall portion. Insertion of the second chain link into the second opening resiliently bends the second flexible gripping member towards the first opening and towards the third wall portion such that if the second chain link is removed from the second opening, the second flexible gripping member resiliently bends back towards the fourth wall portion.

In one example, the first mouth has a first width and the first chain link has a second width, the first width being equal to or greater than the second width.

In one example, a first hook member is provided that has a hook portion configured to extend through a loop of a link member of the first chain link. A second hook member has a hook portion configured to extend through a loop of a link member of the second chain link.

In one example, the first hook member has a first mount for mounting the first hook member to an opening in a first upright member. The second hook member has a second mount for mounting the second hook member to an opening in a second upright member.

In one example, the first, second, third and fourth wall portions are unitarily formed in a single body. The first and third wall portions are aligned in a back-to-back relationship. The second and fourth wall portions are aligned in a back-to-back relationship. A fifth wall portion extends transverse between the first and second wall portions and extends transverse between the third and fourth wall portions.

In one example, the fifth wall portion separates the first opening from the second opening.

In one example, a free end of the first wall portion is curved towards the second wall portion. A free end of the second wall portion is curved towards the first wall portion. A free end of the third wall portion is curved towards the fourth wall portion. A free end of the fourth wall portion is curved towards the third wall portion.

In one example, the free end of the first wall portion extends towards the second wall portion to a lesser extent than the first flexible gripping member. The free end of the third wall portion extends towards the fourth wall portion to a lesser extent than the second flexible gripping member.

In one example, in a relaxed state, the first flexible gripping member extends from the first wall portion towards the second wall portion a first distance that is greater than a second distance between the first and second wall portions. A third flexible gripping member extends from the second wall towards the first wall portion. In a relaxed state, the third flexible gripping member extends from the second wall portion towards the first wall portion a third distance that is greater than the second distance between the first and second wall portions.

In one example, a third flexible gripping member extends from the second wall towards the first wall portion. The third flexible gripping member is offset from the first flexible gripping member such that the third flexible gripping member is positioned axially closer to the second opening than the first flexible gripping member.

In an example, a blocking arrangement for a walkway within a retail establishment is provided. The blocking arrangement includes first and second upright members. The second upright member is spaced apart from the first upright member such that the first and second upright members are on opposite sides of the walkway. The blocking arrangement includes a breakaway chain as outlined above. The first chain portion has an end operably secured to the first upright member. The second chain portion has an end operably secured to the second upright member. When the first chain portion is operably secured to the first upright member, the second chain portion is operably secured to the second upright member, and the breakaway connector is engaged with the first and second chain links, the breakaway chain blocks the walkway.

In one example, a first hook member has a hook portion configured to extend through a loop of a link member of the first chain portion. The first hook member is attached to the first upright member and secures the first chain portion to the first upright member. A second hook member has a hook portion configured to extend through a loop of a link member of the second chain portion. The second hook member is attached to the second upright member and secures the second chain portion to the second upright member.

In one example, the first hook member has a first mount for mounting the first hook member to an opening in the first upright member. The second hook member has a second mount for mounting the second hook member to an opening in the second upright member.

In one example, the first upright member has a plurality of vertically spaced openings. The opening in the first upright member is one of the plurality of vertically spaced openings. The second upright member has a plurality of vertically spaced openings. The opening in the second upright member is one of the plurality of vertically spaced openings.

In one example, the engagement between the first chain link and the breakaway connector is less than the operable securement between the first upright member and the first chain portion. The engagement between the second chain link and the breakaway connector is less than the operable securement between the second upright member and the second chain portion.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 8 is a top view illustration of portions of the breakaway chain and a breakaway connector disengaged from one another.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
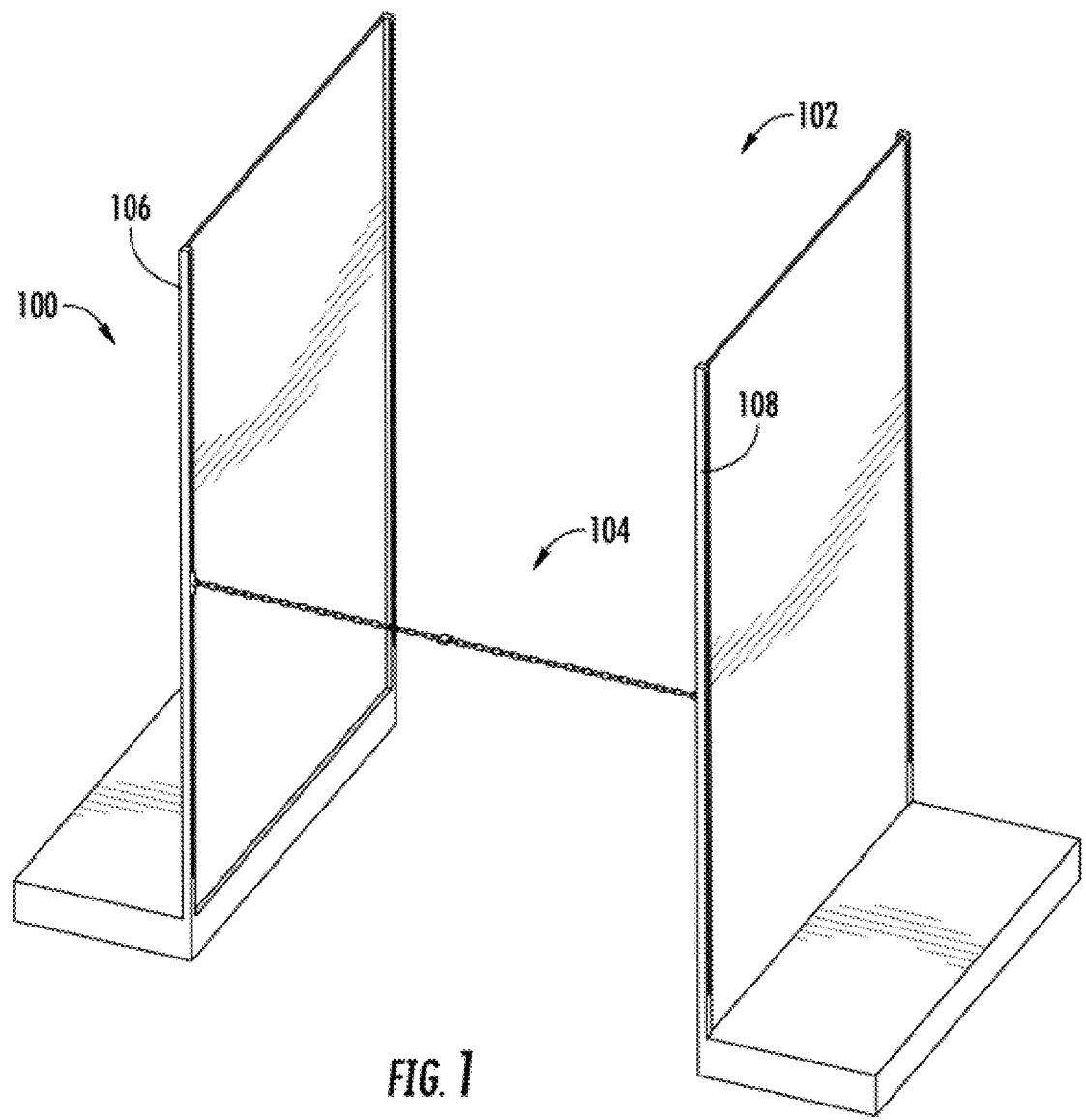
FIG. 1 is a schematic image of a walkway that could be found at a retail environment such as a checkout line that includes a blocking arrangement.

FIG. 1 illustrates a blocking arrangement 100 installed to block a walkway 102. In some instances, the walkway 102 will be within a retail establishment. In particular, the walkway 102 may be provided as part of a checkout lane within the retail establishment.

In this example, the blocking arrangement 100 includes a breakaway chain 104 that is operably secured to and extends between a pair of uprights 106, 108.

Each upright 106, 108 has a plurality of vertically spaced openings 110 located in faces of the uprights 106, 108 that face inward towards the walkway, e.g. towards the opposed upright 106, 108. The openings 110 allow for vertically operably securing the breakaway chain 104 at a desired vertical location relative to the floor upon which people will walk.

Figure 2:
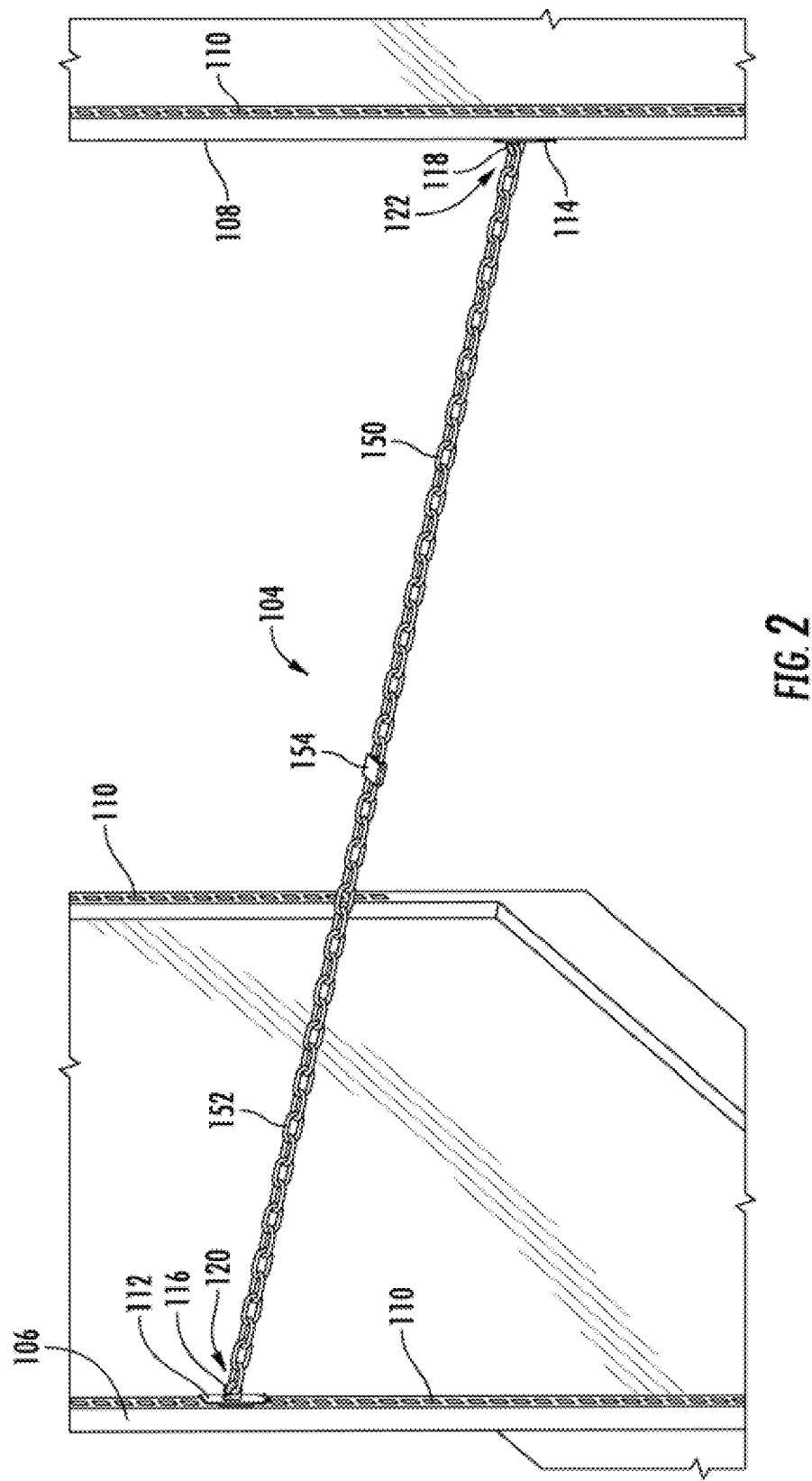
FIG. 2 is an enlarged image of the walkway of FIG. 1.

With additional reference to FIG. 2, in this example, the breakaway chain 104 is operably secured to the uprights 106, 108 with hook members 112, 114. Each hook member 112, 114 has a hook portion 116, 118, that passes through an opening 120, 122 in a corresponding chain link 141, 143 of the breakaway chain 104. Thus, the breakaway chain 104 extends laterally between the opposed uprights 106, 108 to block the walkway 102 therebetween.

Figure 3:
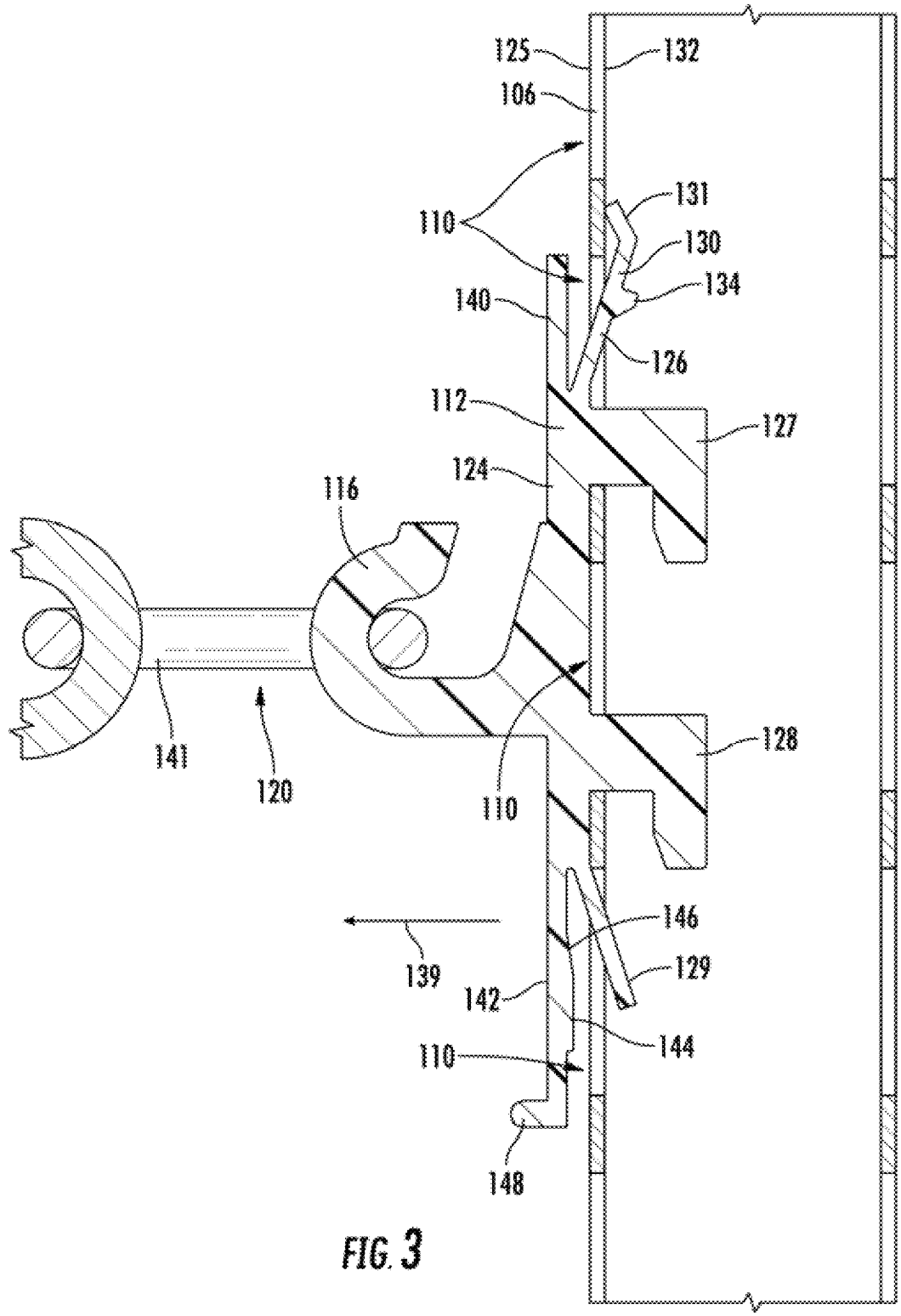
FIG. 3 is a cross-sectional illustration illustrating a hook member mounting one end of a breakaway chain of the blocking arrangement of FIG. 1 with the hook member mounted to an upright.
Figure 4:
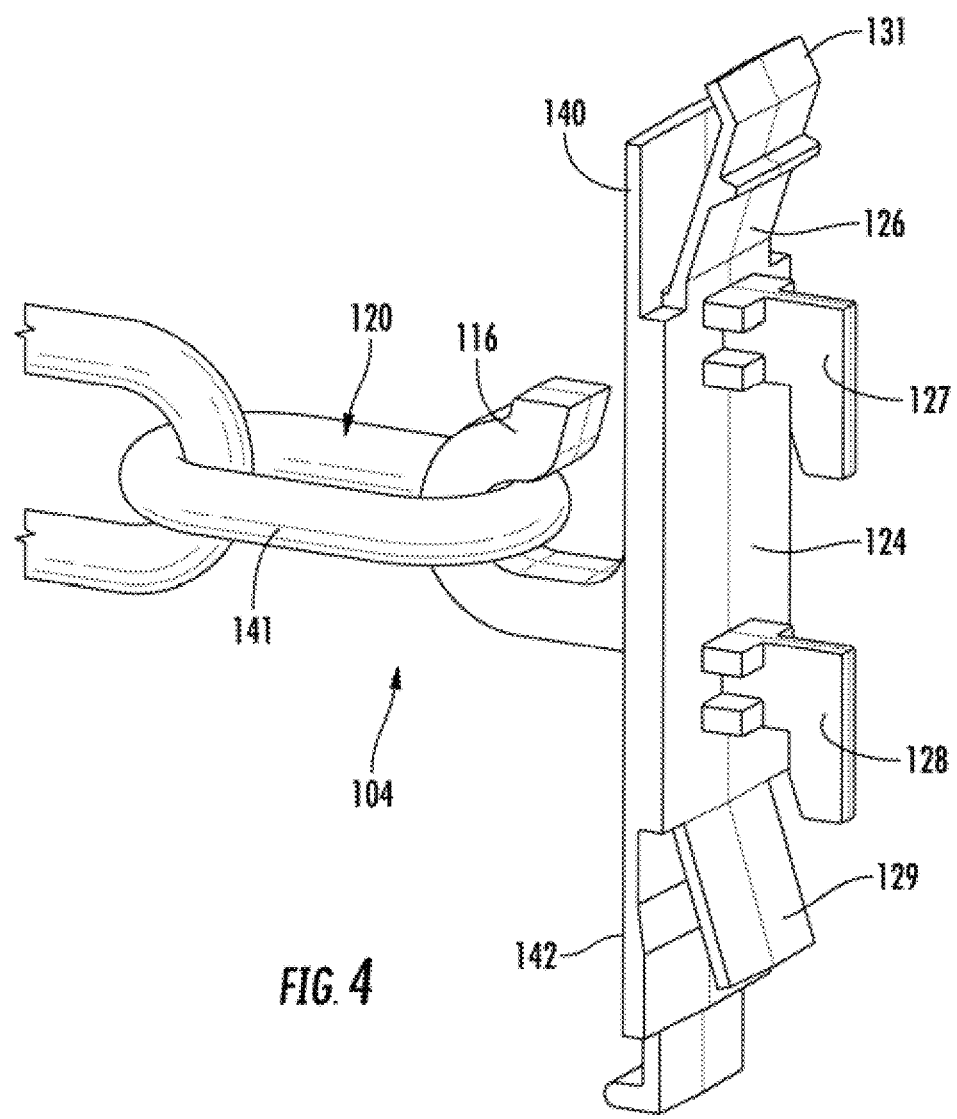
FIG. 4 is a perspective view of the end of the breakaway chain and the hook member.
Figure 5:
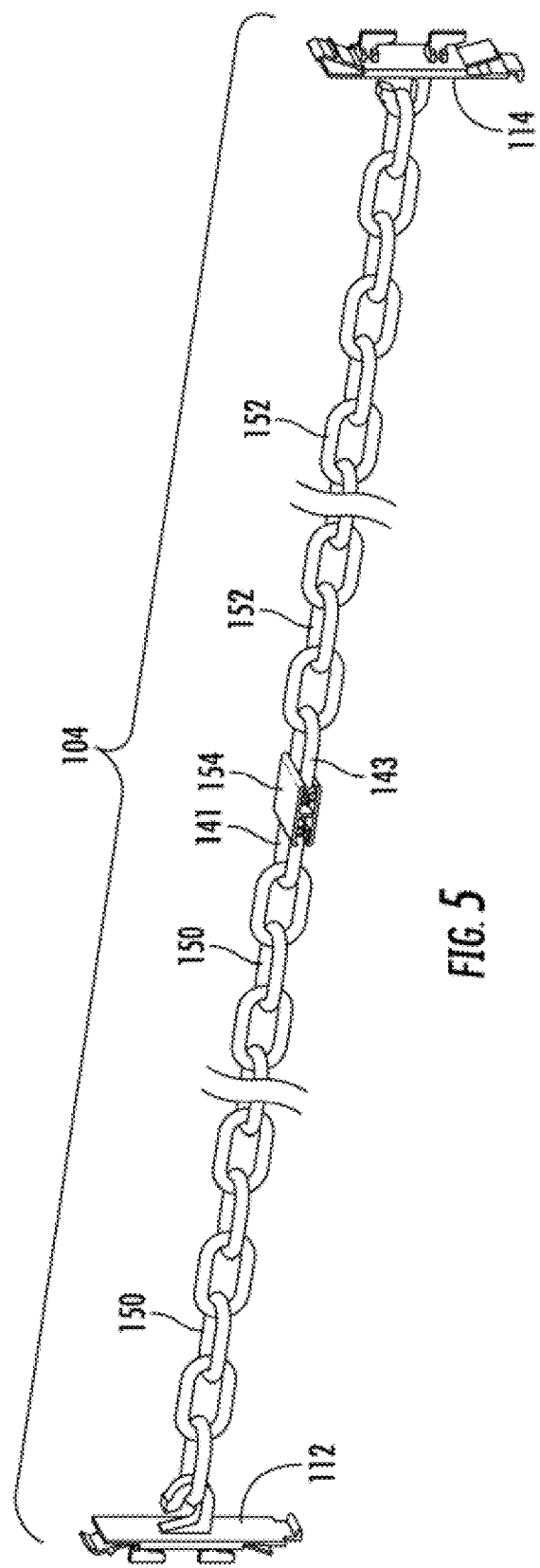
FIG. 5 is a fragmented illustration of the breakaway chain and the hook members for securing the breakaway chain to opposes support structures such as uprights of FIG. 1.

With reference to FIG. 3, a cross-sectional enlarged illustration of an exemplary hook member 112 is illustrated mounted to upright 106. Other hook members are contemplated.

In this example, the hook member 112 includes a main body 124. Hook portion 116 extends laterally outward from the main body 124 and away from upright 106, when mounted.

In this example, the main body 124 is positioned, at least in part, on a first side 125 of the upright 106. The first side 125 faces the opposed upright 108 and the walkway in use.

A plurality of legs 126-129 extend rearward from the main body 124. The legs extend through openings 110 in the upright 106.

In this example, leg 126 includes first and second angled portions 130, 131. Angled portion 130 extend rearward from main body 124 at a first angle. The second angle portion 131 extends from an end of the first angled portion 130 back towards a second surface 132 of the upright 106 opposite the first side 125.

A distal end of the second angle portion 131, which provides a distal end of the leg 126, contacts second side 132, when installed.

The first angled portion includes a rib 134 that projects away from the second side 132.

Legs 127 and 128 are similar to one another and are hook shaped. Each leg 127, 128 includes a first portion 136 extending rearward from the main body 124 and a second portion 138 that extends transverse to first portion 126. In this example, the second portion 138 extends downward. These legs 127, 128 help prevent the hook member 112 from being pulled out of the upright 106 by lateral force illustrated by arrow 139.

Leg 129 is an angled portion that extends rearward from the main body 124.

The first and second sides 125, 132 in this example are provided as opposed surfaces of a wall portion of the upright 106. The openings 110 extend through the wall portion and through the first and second sides 125, 132.

Flanges 140, 142 extend from the main body 124. Flange 140 has a constant thickness while flange 142 includes an increased thickness region 144. There is a tapered region 146 proximate the increased thickness region 144 and that is interposed between the main body 124 and the increased thickness region 144.

Flanges 140, 142 are at opposite ends of the main body 124 and extend outward from the main body away from one another.

A distal end of flange 142 includes a forward extending foot 148. More particularly, when mounted, the foot 148 extends from flange 142 away from the upright 106.

In this example, with reference to FIGS. 1 and 2, the breakaway chain 104 includes first and second chain portions 150, 152 and a breakaway connector 154. The breakaway chain portions 150, 152 could be formed from plastic or metal or any other suitable material.

The breakaway connector 154 connects the first and second chain portions 150, 152 together while opposite ends of the first and second chain portions 150, 152 are attached to the uprights 106, 108 by the hook members 112, 114.

Figure 6:
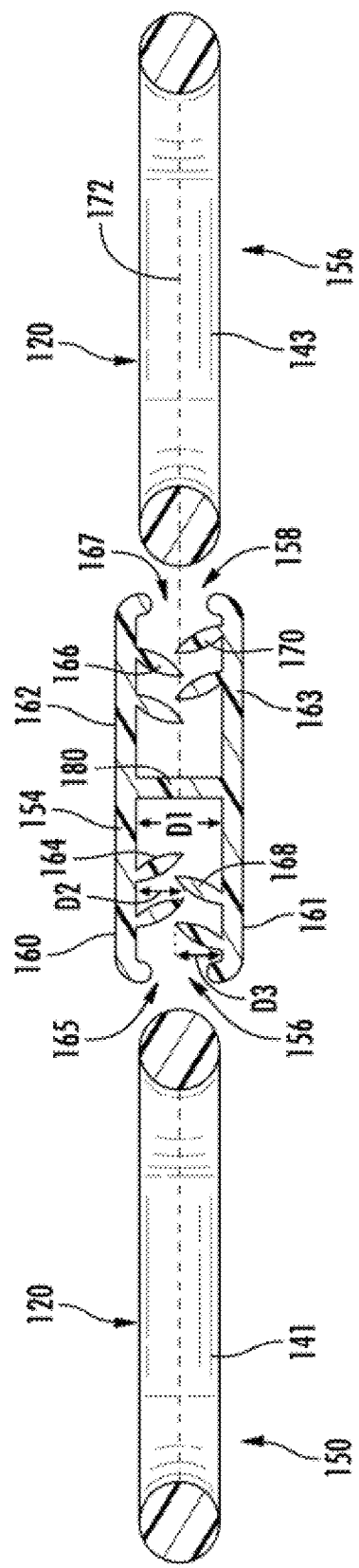
FIG. 6 is a cross-sectional illustration of a portion of the breakaway chain of FIG. 1 with the chain portions disengaged from the breakaway connector thereof.

FIG. 6 illustrates one link 141 of chain portion 150 and one link 143 of chain portion 152 as well as the breakaway connector 154 in cross-section.

Figure 7:
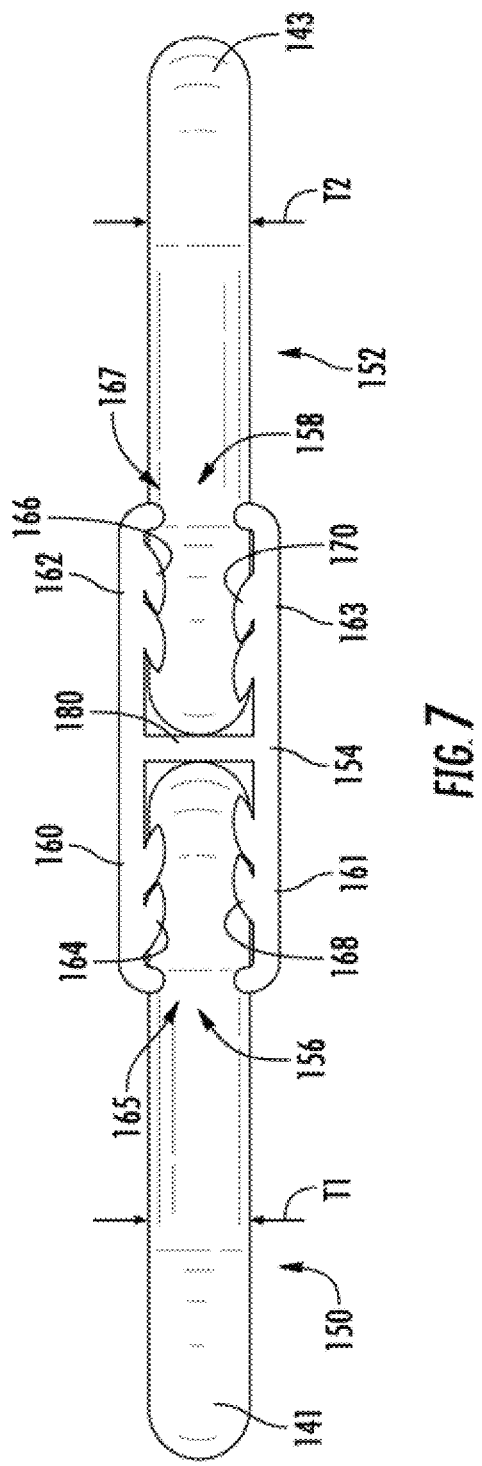
FIG. 7 is a side view illustration of a portion of the breakaway chain with chain portions engaged with the breakaway connector of the breakaway chain.

The breakaway connector 154 includes a first opening 156 and a second opening 158. When assembled, as illustrated in FIG. 7, one link 141 of the first chain portion 150 is received in the first opening 156 and one link 143 of the second chain portion 152 is received in the second opening 158. The breakaway connector is configured to grip the links 141, 143 to secure the two chain portions 150, 152 together.

In this example, the first opening 156 is formed between first and second wall portions 160, 161. The second opening 158 is formed between third and fourth wall portions 162, 163.

The breakaway connector 154 includes a plurality of flexible gripping members for engaging corresponding links 141, 143 of the chain portions 150, 152.

In this example, a plurality of first gripping members 164 extend from the first wall portion 160 toward the second wall portion 161. Additionally, the first gripping members 164 extend away from the mouth 165 of the first opening 156. The first gripping members 164 extend toward the second opening 158. The first gripping members 164 extend from the first wall portion 160 in an angled manner.

A plurality of second gripping members 166 extend from the third wall portion 162 toward the fourth wall portion 163. In this example, the second gripping members 166 extend towards the first gripping members 164 and the first gripping members 164 extend toward the second gripping members 166. Additionally, the second gripping members 166 extend away from the mouth 167 of the second opening 158. The second gripping members 166 extend toward the first opening 156. The second gripping members 166 extend from the third wall portion 162 in an angled manner.

The mouth 167 of the second opening, in this example, opens in an opposite direction as mouth 165.

A plurality of third gripping members 168 extend from the second wall portion 161 toward the first wall portion 160. In this example, the third gripping members 168 extend toward the second gripping members 166 and the second gripping members 166 extend toward the third gripping members 168. Additionally, the third gripping members 168 extend away from the mouth 165 of the first opening 156. The third gripping members 168 extend from the second wall portion 161 in an angled manner.

A plurality of fourth gripping members 170 extend from the fourth wall portion 163 toward the third wall portion 162. In this example, the fourth gripping members 170 extend toward the first and third gripping members 164, 168 and the first and third gripping members 164, 168 extend toward the fourth gripping members 170. The fourth gripping members 170 extend away from the mouth 167 of the second opening 168. The fourth gripping members 170 extend from the fourth wall portion 163 in an angled manner.

While a plurality of gripping members 164, 166, 168, 170 are illustrated, in other examples, fewer or a greater number gripping members can be provided. Further, both the first and third gripping members 164, 170 need not be provided in the first opening 156 in some embodiments. Both the second and fourth gripping members 166, 170 need not be provided in the second opening 158 in some embodiments. While two of each gripping member are illustrated fewer or a greater number of each gripping member could be provided.

With reference to FIG. 6, the first gripping members 164 are axially offset from the third gripping members 168 such that the first and third gripping members 164, 168 are axially staggered along an axis 172 that extends through the mouths 165, 167 of the first and second openings 156, 158, respectively. In this example, one of the first gripping members 164 is positioned between a pair of adjacent third gripping members 168. Similarly, one of the third gripping members 168 is positioned between a pair of adjacent first gripping members 164.

The second and fourth gripping members 166, 170 are similarly axially offset as the first and third gripping members 164, 168.

In FIG. 6, the breakaway connector 154 and particularly the gripping members 164, 166, 168, 170 are illustrated in a relaxed state.

The first and second wall portions 160, 161 are axially spaced a first distance D1 in the relaxed state. In this example, the first gripping members 164 extend axially away from the first wall portion 160 a second distance D2 that is less than D1. In a preferred example, distance D2 is at least half of the distance D1. Similarly, the third gripping members 168 extend axially away from the second wall portion 161 a third distance D3 that is less than D1. In a preferred example, distance D3 is at least half the distance D1. Further, in an even more preferred example, the distance D2 is equal to the distance D3.

In the example where D2 and D3 are greater than half the distance D1, the first and third gripping members 164, 168 axially overlap along a second axis that is perpendicular to axis 172.

In one example, the second and fourth gripping members 166, 170 are similarly dimensioned as the first and third gripping members 164, 168.

In this example, the first and third wall portions 160, 162 are generally coplanar, aligned in a back-to-back orientation, and are part of a same bigger wall portion. Similarly, the second and fourth wall portions 161, 163 are generally coplanar, aligned in a back-to-back orientation, and are part of a same bigger wall portion.

A fifth wall portion 180 is transverse to the first, second, third, and fourth wall portions 160-163 and separates the first opening 156 from the second opening 158. The first, second, third, fourth, and fifth wall portions 160-163 and 180 generally form an H-shaped profile.

In this example, the first-fifth wall portions 160-163 and 180 are formed from a single continuous piece of material.

Further, in this example, the first, second, third, and fifth wall portions 160-163, 180 as well as the first, second, third and fourth gripping members 164, 166, 168, 170 are all formed from a single continuous piece of material.

The distal ends of the first, second, third, and fourth wall portions 160-163 in this example are curved axially inward. More particularly, the distal end of first wall portion 160 is curved inward towards the second wall portion 161. In this example, the curved portion extends towards the second wall portion 161 a lesser distance than D2. The distal end of the second wall portion 161 is curved inwards towards the first wall portion 160. In this example, the curved portion extends towards the first wall portion 160 a lesser distance than D3. The distal end of the third wall portion 162 is curved inwards towards the fourth wall portion 163. In this example, the curved portion extends towards the fourth wall portion 163 a lesser distance than D1. The distal end of the fourth wall portion is curved inwards towards the third wall portion 162. In this example, the curved portion extends towards the third wall portion 162 a lesser distance than D3.

The curved end portions define the mouths 165, 167. In this example, the distance between the curved ends of the first and second wall portions is greater than distances D2 and D3, but less than the distance D1.

In one example, the distance between the curved ends of the third and fourth wall portions is the same as the distance between curved ends of the first and second wall portions such that the size of the mouths 165, 167 is the same.

The breakaway connector 154 can be formed by extruding the continuous piece of material, injection molding or other manufacturing methods. Preferably, the breakaway connector is formed from a resilient flexible plastic material.

The angled orientation of the gripping members 164, 166, 168, 170 allows for easy insertion of the corresponding chain links 141, 143 during assembly.

FIG. 7 illustrates a simplified/schematic side view of the breakaway connector 154 engaging links 141, 143 of the first and second chain portions 150, 152. In this example, it appears that the gripping members 164, 166, 168, 170 and curved ends of the first, second, third, and fourth wall portions extend into and pierce the chain links 141, 143 inserted into the corresponding openings 156, 158. However, in practice, this would not occur or not occur to such an extent.

As illustrated in FIG. 7, the gripping members have been flexibly bent due to insertion of the chain links 141, 143. More particularly, the first and third gripping members 164, 168 have been bent towards the second opening 158 and the fifth wall portion 180. Likewise, the second and fourth gripping members 166, 170 have been bent towards the second first opening 156 and the fifth wall portion 180.

Further, the first gripping members 164 have been bent back towards the first wall portion 160 from which they extend. The second gripping members 166 have been bent back towards the third wall portion 162 from which they extend. The third gripping members 168 have been bent back towards the second wall portion 161 from which they extend. The fourth gripping members 170 have been bent back towards the fourth wall portion 163 from which they extend.

As such, when the chain links 141, 143 are installed in the openings 156, 158, the tips of the gripping members 164, 166, 168, 170 are closer to the corresponding wall portions 160-163 from which the gripping members 164, 166, 168, 170 extend than when the chain links 141, 143 are removed and the breakaway connector 154 is in a relaxed state.

While illustrated as being unbent, one or both of the first and second wall portions 160, 161 would also typically be bent. This is due to the fact that the mouth 165 is smaller in dimension than the thickness T1 of the corresponding chain link 141 of chain portion 150. Similarly, one or both of the third and fourth wall portions 162, 163 would also typically be bent. This is due to the fact that the mouth 167 is smaller in dimension than the thickness T2 of the corresponding chain link 143 of chain portion 152.

In one example, breakaway connector 154 is resilient such that if the chain links 141, 143 are removed the portions that are bent will return to their previously relaxed and unbent conditions.

In one example, the gripping between the chain links 141, 143 and the breakaway connector 154 is less than or equal to 5 pounds such that 5 pounds of tension applied to the assembly will cause at least one of the links to be removed from the breakaway connector 154.

While the angled orientation of the gripping members 164, 166, 168, 170 assists in insertion of the chain links 141, 143, preferably, they resist removal of the chain links. As such, in some embodiments, it takes more force to remove the chain links 141, 143 from the breakaway connector 154 than to insert the chain links 141, 143 into the openings 156, 158.

As illustrated in FIG. 7, when the chain links 141, 143 are installed in the breakaway connector 154, the links 141, 143 extend axially out of the mouths 165, 167 of the corresponding openings 156, 158. The chain links 141, 143 extend out of the breakaway connector 154 in opposite directions.

With reference to FIG. 8, the width W1 of the breakaway connector 154 (and the openings 156, 158 and mouths thereof 165, 167) is greater than or equal to the widths W2, W3 of the chain links 141, 143 of the first and second chain portions 150, 152.

Because, in some embodiments, the gripping members 164, 166, 168, 170 are flexible, when the breakaway chain 104 is broken, e.g. a chain link 141, 143 is removed from the breakaway connector 154, the breakaway chain 104 can be reassembled. In other words, in some examples, the breakaway connector 154 is not a one-time use connector.

In the illustrated example, the chain links 141, 143 slide axially into the breakaway connector 154 without latching the breakaway connector 154 to the chain links 141, 143.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A breakaway chain comprising:
   a breakaway connector including:
     a first opening defined between a first wall portion and a second wall portion spaced away from the first wall portion;
     a first flexible gripping member extending from the first wall portion towards the second wall portion;
     a second opening between a third wall portion and a fourth wall portion spaced away from the third wall portion;
     a second flexible gripping member extending from the third wall portion towards the fourth wall portion;
   a first chain portion having a first chain link, the first chain link inserted into the first opening providing an engagement with the first flexible gripping member;
   a second chain portion having a second chain link, the second chain link inserted into the second opening providing an engagement with the second flexible gripping member; and
   wherein the engagement between the first chain link and the breakaway connector is not greater than 5 lbs. such that an application of a force greater than 5 lbs. will cause the first chain link to be removed from the breakaway connector.

2. A breakaway chain comprising:
   a breakaway connector including:
     a first opening defined between a first wall portion and a second wall portion spaced away from the first wall portion;
     a first flexible gripping member extending from the first wall portion towards the second wall portion;
     a second opening between a third wall portion and a fourth wall portion spaced away from the third wall portion;
     a second flexible gripping member extending from the third wall portion towards the fourth wall portion;
   a first chain portion having a first chain link, the first chain link inserted into the first opening providing an engagement with the first flexible gripping member;
   a second chain portion having a second chain link, the second chain link inserted into the second opening providing an engagement with the second flexible gripping member; and
   wherein:
   the first flexible gripping member is one of a plurality of first flexible gripping members, each first flexible gripping member of the plurality of first gripping members extends from the first wall portion towards the second wall portion;
   the second flexible gripping member is one of a plurality of second flexible gripping members, each second flexible gripping member of the plurality of second gripping members extends from the third wall portion towards the fourth wall portion;

the plurality of first flexible gripping members are axially spaced apart in a direction extending towards the second opening; and the plurality of second flexible gripping members are axially spaced apart in a direction extending towards the first opening.

3. A breakaway chain comprising:
a breakaway connector including:
a first opening defined between a first wall portion and a second wall portion spaced away from the first wall portion;
a first flexible gripping member extending from the first wall portion towards the second wall portion;
a second opening between a third wall portion and a fourth wall portion spaced away from the third wall portion;
a second flexible gripping member extending from the third wall portion towards the fourth wall portion;
a first chain portion having a first chain link, the first chain link inserted into the first opening providing an engagement with the first flexible gripping member;
a second chain portion having a second chain link, the second chain link inserted into the second opening providing an engagement with the second flexible gripping member; and
wherein if either the first chain link or the second chain link is removed from the breakaway connector, the first chain link or the second chain link that is removed from the breakaway connector can be reinstalled into the corresponding first opening or second opening by axially sliding the first chain link or the second chain link into the corresponding first opening or second opening and without latching the first opening or the second opening to the breakaway connector.

4. A breakaway chain comprising:
a breakaway connector including:
a first opening defined between a first wall portion and a second wall portion spaced away from the first wall portion;
a first flexible gripping member extending from the first wall portion towards the second wall portion;
a second opening between a third wall portion and a fourth wall portion spaced away from the third wall portion;
a second flexible gripping member extending from the third wall portion towards the fourth wall portion;
a first chain portion having a first chain link, the first chain link inserted into the first opening providing an engagement with the first flexible gripping member;
a second chain portion having a second chain link, the second chain link inserted into the second opening providing an engagement with the second flexible gripping member;
wherein:
the first flexible gripping member extends away from the first wall portion at an angle and away from a mouth of the first opening towards the second opening; and
the second flexible gripping member extends away from the third wall portion at an angle and way from a mouth of the second opening towards the first opening.

5. A breakaway chain comprising:
a breakaway connector including:
a first opening defined between a first wall portion and a second wall portion spaced away from the first wall portion;

a first flexible gripping member extending from the first wall portion towards the second wall portion;
a second opening between a third wall portion and a fourth wall portion spaced away from the third wall portion;
a second flexible gripping member extending from the third wall portion towards the fourth wall portion;
a first chain portion having a first chain link, the first chain link inserted into the first opening providing an engagement with the first flexible gripping member;
a second chain portion having a second chain link, the second chain link inserted into the second opening providing an engagement with the second flexible gripping member; and
wherein:
insertion of the first chain link into the first opening bends the first flexible gripping member towards the second opening and towards the first wall portion; and
insertion of the second chain link into the second opening bends the second flexible gripping member towards the first opening and towards the third wall portion.

6. The breakaway chain of claim 5, wherein the first flexible gripping member is one of a plurality of first flexible gripping members, each first flexible gripping member of the plurality of first flexible gripping members extends from the first wall portion towards the second wall portion.

7. The breakaway chain of claim 5, wherein:
the first chain link is inserted into the first opening through a first mouth of the first opening;
the second chain link is inserted into the second opening through a second mouth of the second opening; and
the first and second mouths facing away from one another.

8. The breakaway chain of claim 7, wherein:
a portion of the first chain link extends out of the first opening in a first direction; and
a portion of the second chain link extends out of the second opening in a second direction opposite the first direction.

9. The breakaway chain of claim 7, wherein the first mouth has a first width and the first chain link has a second width, the first width being equal to or greater than the second width.

10. The breakaway chain of claim 5, further comprising:
a first hook member having a hook portion configured to extend through a loop of a link member of the first chain portion;
a second hook member having a hook portion configured to extend through a loop of a link member of the second chain portion.

11. The breakaway chain of claim 10, wherein:
the first hook member has a first mount for mounting the first hook member to an opening in a first upright member; and
the second hook member has a second mount for mounting the second hook member to an opening in a second upright member.

12. The breakaway chain of claim 5, wherein:
the first, second, third and fourth wall portions are unitarily formed in a single body;
the first and third wall portions aligned in a back-to-back relationship;
the second and fourth wall portions aligned in a back-to-back relationship;

a fifth wall portion extends transverse between the first and second wall portions and extends transverse between the third and fourth wall portions.

13. The breakaway chain of claim 12, wherein the fifth wall portion separates the first opening from the second opening.

14. The breakaway chain of claim 13, wherein:
a free end of the first wall portion is curved towards the second wall portion;
a free end of the second wall portion is curved towards the first wall portion;
a free end of the third wall portion is curved towards the fourth wall portion; and
a free end of the fourth wall portion is curved towards the third wall portion.

15. The breakaway chain of claim 14, wherein:
the free end of the first wall portion extends towards the second wall portion to a lesser extent than the first flexible gripping member; and
the free end of the third wall portion extends towards the fourth wall portion to a lesser extent than the second flexible gripping member.

16. The breakaway chain of claim 5, wherein:
in a relaxed state, the first flexible gripping member extends from the first wall portion towards the second wall portion a first distance that is greater than a second distance between the first and second wall portions;
a third flexible gripping member extends from the second wall portion towards the first wall portion; and
in a relaxed state, the third flexible gripping member extends from the second wall portion towards the first wall portion a third distance that is greater than the second distance between the first and second wall portions.

17. A breakaway chain comprising:
a breakaway connector including:
  a first opening defined between a first wall portion and a second wall portion spaced away from the first wall portion;
  a first flexible gripping member extending from the first wall portion towards the second wall portion;
  a second opening between a third wall portion and a fourth wall portion spaced away from the third wall portion;
  a second flexible gripping member extending from the third wall portion towards the fourth wall portion;
a first chain portion having a first chain link, the first chain link inserted into the first opening providing an engagement with the first flexible gripping member;
a second chain portion having a second chain link, the second chain link inserted into the second opening providing an engagement with the second flexible gripping member;
wherein:
  insertion of the first chain link into the first opening resiliently bends the first flexible gripping member towards the second opening and towards the first wall portion such that if the first chain link is removed from the first opening, the first flexible gripping member resiliently bends back towards the second wall portion; and
  insertion of the second chain link into the second opening resiliently bends the second flexible gripping member towards the first opening and towards the third wall portion such that if the second chain link is removed from the second opening, the second flexible gripping member resiliently bends back towards the fourth wall portion.

18. A breakaway chain comprising:
a breakaway connector including:
  a first opening defined between a first wall portion and a second wall portion spaced away from the first wall portion;
  a first flexible gripping member extending from the first wall portion towards the second wall portion;
  a second opening between a third wall portion and a fourth wall portion spaced away from the third wall portion;
  a second flexible gripping member extending from the third wall portion towards the fourth wall portion;
a first chain portion having a first chain link, the first chain link inserted into the first opening providing an engagement with the first flexible gripping member;
a second chain portion having a second chain link, the second chain link inserted into the second opening providing an engagement with the second flexible gripping member;
wherein:
  a third flexible gripping member extends from the second wall portion towards the first wall portion;
  the third flexible gripping member is offset from the first flexible gripping member such that the third flexible gripping member is positioned axially closer to the second opening than the first flexible gripping member.

19. A blocking arrangement for a walkway within a retail establishment comprising:
a first upright member;
a second upright member spaced apart from the first upright member such that the first and second upright members are on opposite sides of the walkway;
a breakaway chain including:
  a breakaway connector including:
    a first opening defined between a first wall portion and a second wall portion spaced away from the first wall portion;
    a first flexible gripping member extending from the first wall portion towards the second wall portion;
    a second opening between a third wall portion and a fourth wall portion spaced away from the third wall portion;
    a second flexible gripping member extending from the third wall portion towards the fourth wall portion;
  a first chain portion having a first chain link, the first chain link inserted into the first opening providing an engagement with the first flexible gripping member; and
  a second chain portion having a second chain link, the second chain link inserted into the second opening providing an engagement with the second flexible gripping member:
wherein:
  the first chain portion has an end operably secured to the first upright member;
  the second chain portion has an end operably secured to the second upright member; and
  when the first chain portion is operably secured to the first upright member, the second chain portion is operably secured to the second upright member, and the breakaway connector is engaged with the first and second chain links, the breakaway chain blocks the walkway.

20. The blocking arrangement of claim 19, further comprising:
- a first hook member having a hook portion configured to extend through a loop of a link member of the first chain portion, the first hook member attached to the first upright member and securing the first chain portion to the first upright member; and
- a second hook member having a hook portion configured to extend through a loop of a link member of the second chain portion, the second hook member attached to the second upright member and securing the second chain portion to the second upright member.

21. The blocking arrangement of claim 20, wherein:
the first hook member has a first mount for mounting the first hook member to an opening in the first upright member; and
the second hook member has a second mount for mounting the second hook member to an opening in the second upright member.

22. The blocking arrangement of claim 21, wherein:
the first upright member has a plurality of vertically spaced openings, the opening in the first upright member being one of the plurality of vertically spaced openings; and
the second upright member has a plurality of vertically spaced openings, the opening in the second upright member being one of the plurality of vertically spaced openings.

23. The blocking arrangement of claim 19, wherein:
the engagement between the first chain link and the breakaway connector is less than an operable securement between the first upright member and the first chain portion; and
the engagement between the second chain link and the breakaway connector is less than an operable securement between the second upright member and the second chain portion.

* * * * *

UNITED STATES PATENT AND TRADEMARK OFFICE
CERTIFICATE OF CORRECTION

| | | |
|---|---|---|
| PATENT NO. | : 12,044,289 B2 | Page 1 of 1 |
| APPLICATION NO. | : 17/675943 | |
| DATED | : July 23, 2024 | |
| INVENTOR(S) | : Keith C. Eden | |

It is certified that error appears in the above-identified patent and that said Letters Patent is hereby corrected as shown below:

In the Claims

Column 14, Claim 19, Line 56 currently reads "gripping member:"
Should correctly read --gripping member;--

Signed and Sealed this
Twenty-second Day of October, 2024

Katherine Kelly Vidal
*Director of the United States Patent and Trademark Office*